United States Patent
Kudana et al.

(10) Patent No.: US 11,398,098 B2
(45) Date of Patent: *Jul. 26, 2022

(54) REAL TIME TRAFFIC SIGN RECOGNITION

(71) Applicant: TEXAS INSTRUMENTS INCORPORATED, Dallas, TX (US)

(72) Inventors: Arun Shankar Kudana, Karnataka (IN); Manu Mathew, Karnataka (IN); Soyeb Nagori, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/865,080

(22) Filed: May 1, 2020

(65) Prior Publication Data

US 2020/0327342 A1 Oct. 15, 2020

Related U.S. Application Data

(63) Continuation of application No. 16/376,438, filed on Apr. 5, 2019, now Pat. No. 10,657,395, which is a continuation of application No. 15/395,141, filed on Dec. 30, 2016, now Pat. No. 10,255,511.

(30) Foreign Application Priority Data

Jan. 4, 2016 (IN) .............................. 201641000153

(51) Int. Cl.
*G06V 20/58* (2022.01)
*G06K 9/62* (2022.01)
*G06V 10/48* (2022.01)

(52) U.S. Cl.
CPC ......... *G06V 20/582* (2022.01); *G06K 9/6257* (2013.01); *G06V 10/48* (2022.01)

(58) Field of Classification Search
CPC ..... G06K 9/6257; G06V 10/48; G06V 20/582
See application file for complete search history.

(56) References Cited

U.S. PATENT DOCUMENTS

| | | | | |
|---|---|---|---|---|
| 5,818,964 | A * | 10/1998 | Itoh | G06T 5/20 |
| | | | | 358/463 |
| 6,169,816 | B1 * | 1/2001 | Ravkin | G01N 15/1475 |
| | | | | 382/128 |
| 7,566,851 | B2 * | 7/2009 | Stein | G08G 1/166 |
| | | | | 250/205 |
| 8,493,446 | B2 * | 7/2013 | Li | B60Q 1/143 |
| | | | | 348/148 |
| 9,141,865 | B2 * | 9/2015 | Erukhimov | G06V 20/582 |

(Continued)

FOREIGN PATENT DOCUMENTS

| | | | |
|---|---|---|---|
| CN | 103761538 A | * | 4/2014 |
| CN | 103761538 A | | 4/2014 |

*Primary Examiner* — Tsung Yin Tsai
(74) *Attorney, Agent, or Firm* — Brian D. Graham; Charles A. Brill; Frank D. Cimino

(57) ABSTRACT

Advanced driver assistance systems can be designed to recognize and to classify traffic signs under real time constraints, and under a wide variety of visual conditions. This disclosure provides techniques that employ binary masks extracted by color space segmentation, with a different binary mask generated for each sign shape. Temporal tracking is employed to add robustness to the detection system. The system is generic, and is trainable to the traffic signs used in various countries.

20 Claims, 6 Drawing Sheets

(56) References Cited

U.S. PATENT DOCUMENTS

| | | | | |
|---|---|---|---|---|
| 9,269,001 B2* | 2/2016 | R | ............................. | H04N 5/235 |
| 9,418,303 B2* | 8/2016 | Zobel | ...................... | G06V 10/32 |
| 9,501,703 B2* | 11/2016 | Oh | ........................ | G06K 9/6257 |
| 10,255,511 B2* | 4/2019 | Kudana | ................. | G06K 9/6257 |
| 2003/0072484 A1* | 4/2003 | Kokko | ................... | G06T 7/0004 |
| | | | | 382/155 |
| 2003/0113017 A1* | 6/2003 | Thomas | ................. | G06V 10/40 |
| | | | | 707/E17.026 |
| 2007/0221822 A1* | 9/2007 | Stein | ...................... | B60Q 1/143 |
| | | | | 250/205 |
| 2010/0265330 A1* | 10/2010 | Li | ......................... | G06V 20/584 |
| | | | | 348/148 |
| 2010/0309315 A1* | 12/2010 | Hogasten | ............... | H04N 7/181 |
| | | | | 348/E5.09 |
| 2015/0117780 A1* | 4/2015 | Erukhimov | ........... | G06V 20/582 |
| | | | | 382/182 |
| 2017/0053167 A1* | 2/2017 | Ren | ......................... | G06V 20/00 |
| 2017/0193313 A1* | 7/2017 | Kudana | ................. | G06K 9/6257 |
| 2017/0312614 A1* | 11/2017 | Tran | ....................... | G16H 50/20 |
| 2019/0163197 A1* | 5/2019 | Qiao | ....................... | G01C 21/00 |
| 2020/0327342 A1* | 10/2020 | Kudana | ................. | G06K 9/6257 |

* cited by examiner

REAL TIME TRAFFIC SIGN RECOGNITION

CROSS-REFERENCE TO RELATED APPLICATIONS

This application is a continuation of U.S. patent application Ser. No. 16/376,438 filed on Apr. 5, 2019, which is a continuation of U.S. patent application Ser. No. 15/395,141, filed on Dec. 30, 2016, now U.S. Pat. No. 10,255,511, which claims priority to Indian Provisional Application No. 201641000153, filed on Jan. 4, 2016, each of which is incorporated herein by reference in its entirety.

TECHNICAL FIELD

The technical field of this invention is image processing.

BACKGROUND

Traffic sign recognition (TSR) is a technology which makes vehicles capable of recognizing the traffic signs appearing in the vicinity of the driving path. TSR systems form an important part of the ADAS (advanced driver assistance systems) that is currently being deployed in the cars of today. It is a classic example of rigid object detection. TSR systems depend on forward facing image sensors. Current TSR systems are aimed to assist the driver in the driving process. But, in the future, TSR systems will play a very crucial role in the functioning of autonomous cars.

Computers face a lot of challenges in identifying traffic signs in images due to the following reasons:

Within-class variability: the same traffic sign in the real world can give rise to different images due to:
  a. Different viewing positions and different distances between the camera and traffic sign positions, and
  b. Photometric effects: positions of multiple different light sources, their color, distribution of shadows, and view obstruction by objects present near the traffic signs.

Between-class similarity: different classes of traffic signs may look very much alike.

Background objects in cluttered urban environments also pose a challenge.

Motion blur in images.

Faded, bent, and dirty sign boards.

Adverse weather conditions like rain and snow.

Traffic signs may also be slightly different from country to country. For example, speed limit traffic signs in some European countries are round with a red circle boundary, while in the US they are rectangular in shape.

SUMMARY

A real time Traffic Sign Recognition (TSR) system is described comprising of a preprocessing stage to identify image regions containing a traffic sign, a localization stage to accurately locate the sign within the image, a categorization stage to categorize the located sign into one of the sign categories, and a temporal smoothening stage remove noise and false detections due to noise.

In accordance with one aspect of this disclosure, an apparatus includes an input to receive data corresponding to an image of a captured scene, a processor, and a memory to store instructions. Execution of the instructions by the processor cause the processor to identify one or more approximate locations of interest in the image based on extracting color information from the image, process each of the one or more approximate locations of interest in the image to identify one or more localized windows in the image in which a traffic sign is present, for each of the one or more localized windows, determine classification information of the respective traffic sign present in the localized window, and output information that identifies, for each traffic sign present in the captured scene, a traffic sign type based on the classification information. The extraction of the color information includes extracting, from the image, an initial binary mask for a respective color of a plurality of colors and then applying to each of the initial binary masks a morphological opening operation to produce a respective final binary mask for each of the initial binary masks.

In accordance with another aspect of this disclosure, a system includes an electronic apparatus that has an input receive data corresponding to an image of a captured scene and processing circuitry. The processing circuitry is configured to identify one or more approximate locations of interest in the image based on extracting color information from the image by extracting, from the image, an initial binary mask for a respective color of a plurality of colors, and then applying to each of the initial binary masks, a morphological opening operation to produce a respective final binary mask for each of the initial binary masks, process each of the one or more approximate locations of interest in the image to identify one or more localized windows in the image in which a traffic sign is present, for each of the one or more localized windows, determine classification information of the respective traffic sign present in the localized window, output information that identifies, for each traffic sign present in the captured scene, a traffic sign type based on the classification information.

BRIEF DESCRIPTION OF THE DRAWINGS

These and other aspects of this invention are illustrated in the drawings, in which.

DETAILED DESCRIPTION

Figure 1:
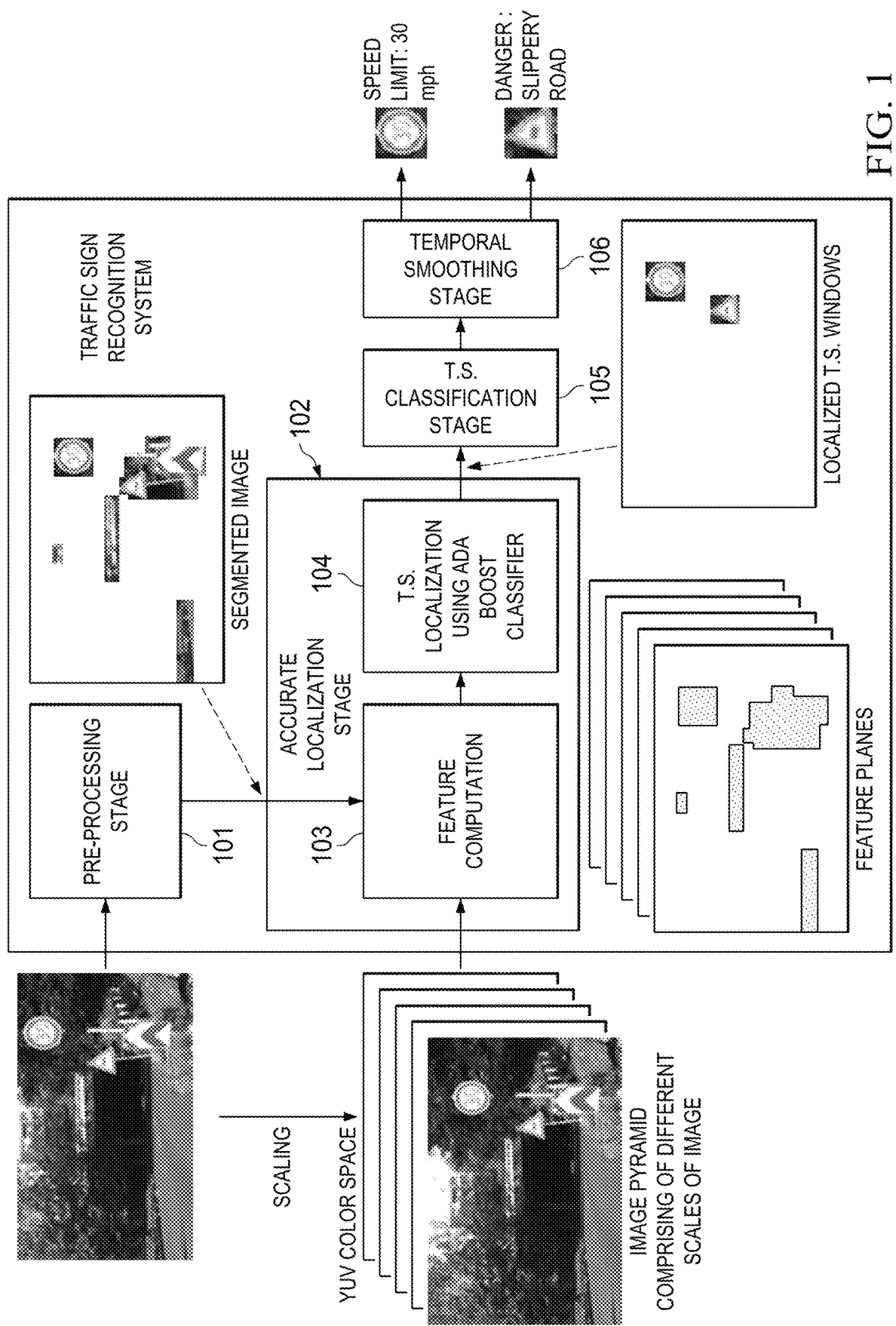
FIG. 1 illustrates a system block diagram of a TSR system in accordance with one example embodiment.

A four stage TSR algorithm is shown as described below. It is also shown pictorially by way of the system block diagram in FIG. 1.

Stage 1: Preprocessing Stage 101

Identify the approximate image regions having traffic signs without missing any traffic sign in input images.

Stage 2: Accurate Localization Stage 102

Stage 2a: Extract features from input images in feature computation block 103

Stage 2b: Accurate localization of the region(s) of the input image that contain the traffic sign(s) using classifier in 104.

Stage 3: Classification Stage 105

The windows localized by stage 2 are categorized into one of a plurality of categories.

Stage 4: Temporal Smoothening Stage 106

This stage is meant to remove the noisy detections and noisy classification that have been obtained from stage 3.

The preprocessing stage 101 works on the input image and is aimed at reducing the complexity of the TSR system by reducing the amount of data that is processed by subsequent stages. It is implemented in two steps:

(1) Extract color cues to find possible locations of traffic signs (2) A shape detector then uses these color cues to identify image locations having traffic signs.

Figure 2:
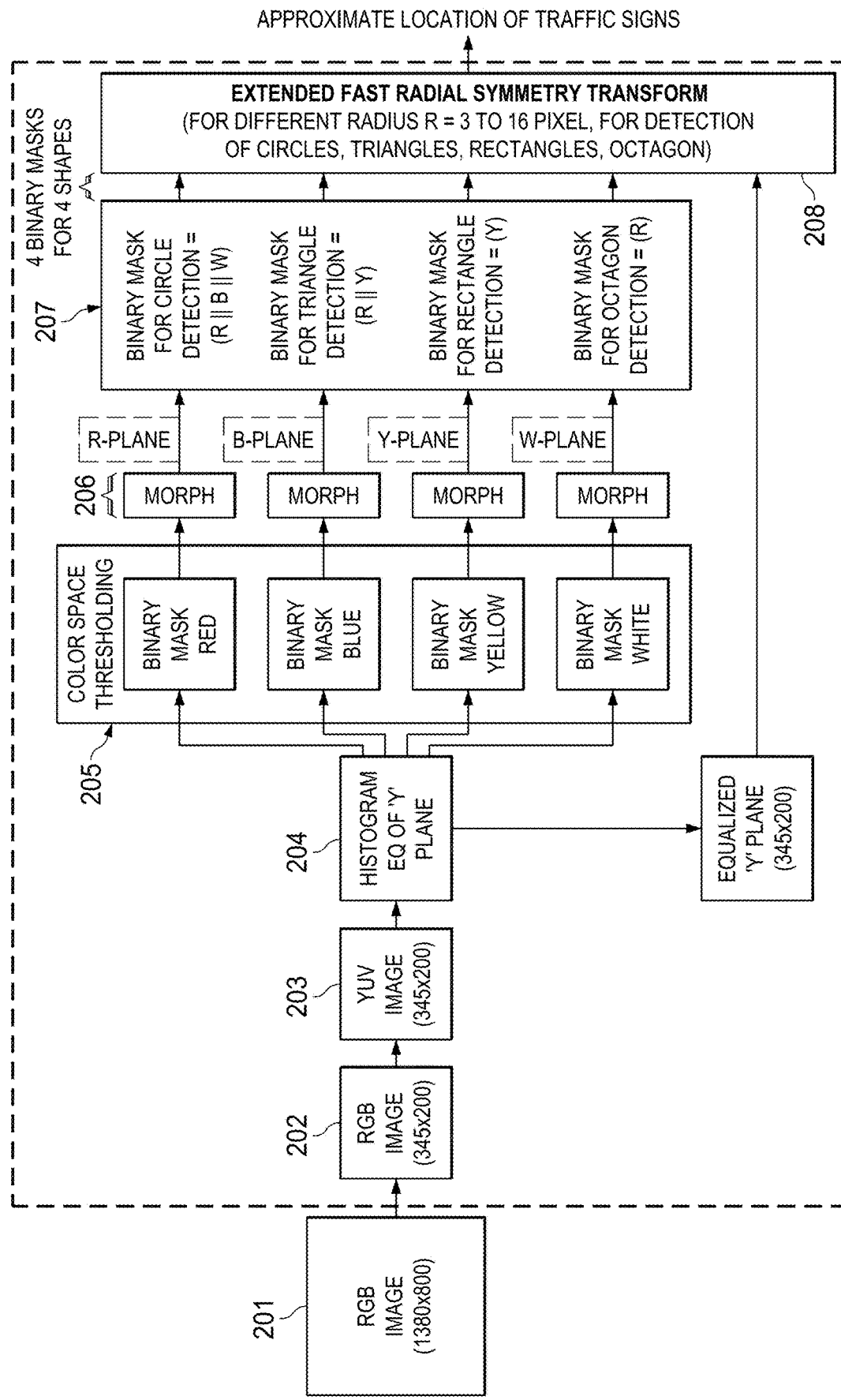
FIG. 2 illustrates a segmentation stage of the TSR system of FIG. 1.

As shown in FIG. 2, the RGB (red, green, blue) input image received at the preprocessing stage is spatially sub-sampled by a factor of four in both directions in block 202, and then converted to a YUV (luminance/chrominance) image in block 203. This is to keep the complexity of the segmentation stage 102 under manageable limits for an embedded system implementation.

Contrast stretching is done in block 204 by using histogram equalization on the Y plane. This improves the performance of the algorithm in many low contrast input images.

Red, Blue, Yellow and White binary masks are extracted by thresholding in the YUV color space (1 mask for each color) in block 205.

Morphological opening (e.g., erosion followed by dilation) is then applied in blocks 206 for each of these binary masks.

The masks are combined in block 207

The binary masks are used by an extended radial symmetry transform (ERST) as shown at block 208. ERST block 208 detects circles, triangles, squares, and octagons in the input images by performing voting for the gradients present in regions of the masks.

Figure 3:
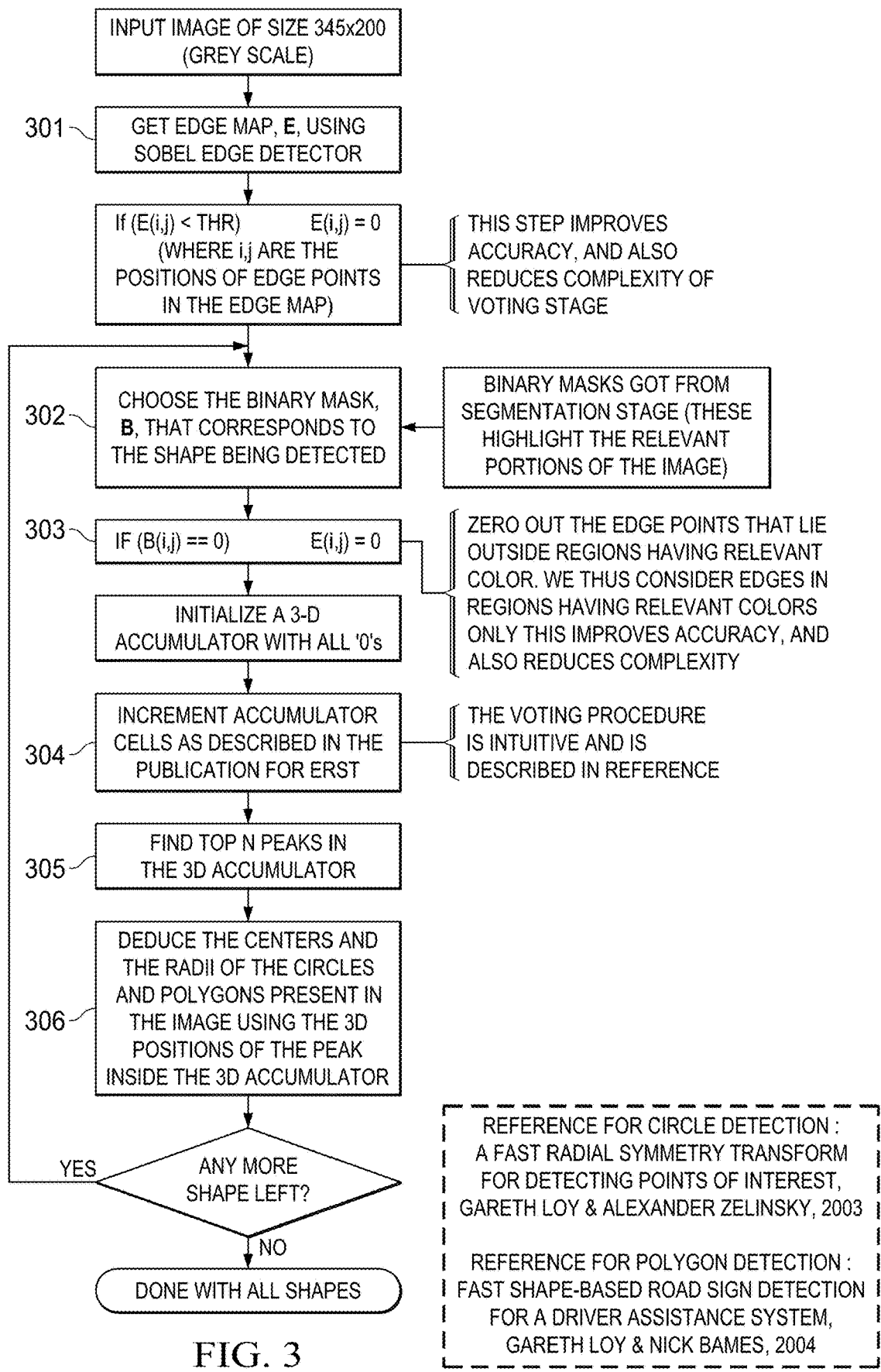
FIG. 3 shows a flow chart of an extended radial symmetry transform (ERST) step.

FIG. 3 shows the flow chart of an ERST process performed by the ERST block 208.

In step 301, a gradient map for an entire input image in grey scale is computed using a Sobel operator.

In step 302, the binary masks obtained from color space thresholding (block 205 of FIG. 2) act as (color) cues for this stage.

The gradients that are less than a threshold are zeroed out in step 303 and are not considered for later stages.

The voting is performed in a 3D accumulator array(x,y,r) at step 304. One 3D accumulator array is maintained for each shape (e.g., circle, square, triangle, and octagon).

Voting (incrementing procedure of accumulator cells) is performed only for the gradient (edge) points for which the binary value in the mask is non-zero.

After voting finishes for the entire image in step 305, the top 'N' peaks in each accumulator are used in step 306 to determine the position and radius of the circle/polygon at that point.

Feature extraction Stage 2a (block 103) is performed by:

(1) For each input image, an image pyramid is prepared. The number of image scales used is dependent on:

(a) Maximum and minimum traffic sign size to be detected, (b) Input image dimensions, and (c) Complexity, accuracy tradeoff considerations.

Figure 4:
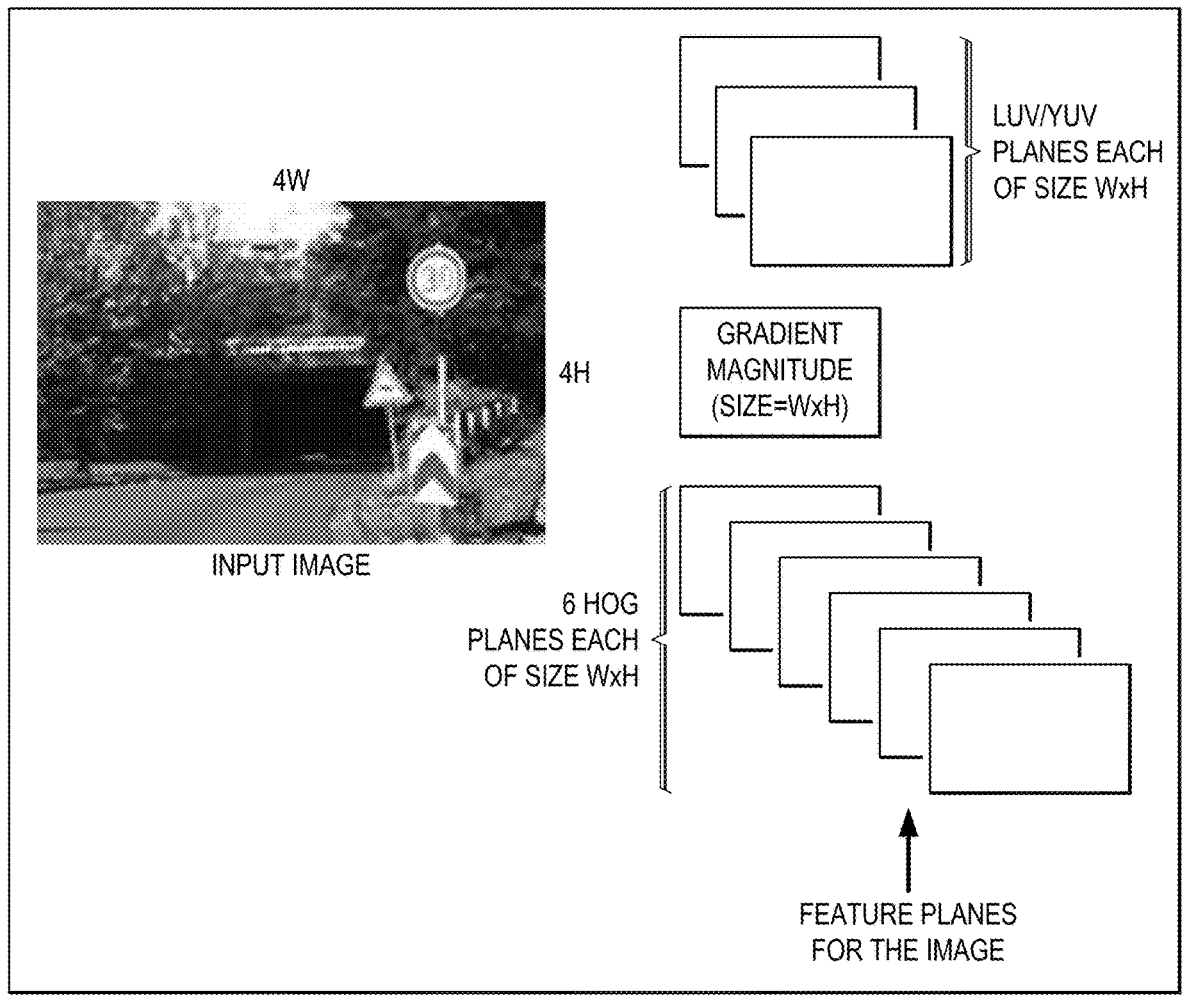
FIG. 4 illustrates the computed feature planes.

(2) Aggregate Channel Features (ACF) planes are computed for every scale of each image, as shown in FIG. 4.

ACF is a collection of 10 feature planes of 3 channels comprising of original pixels of YUV space, 1 Gradient magnitude channel and 6 orientations channels of "histogram of oriented gradients" (HOGS).

Each of HOG orientation channel used as a part of ACF is computed from a cell size of 4×4 pixels without any overlap between cells and without block normalization.

Traffic sign localization Stage 2b is performed by:

(1) An ADA boost (Adaptive Boosting) classifier is used for this localization. Boosting is an approach to machine learning based on the idea of creating a highly accurate prediction rule by combining many relatively weak and inaccurate rules.

Figure 6:
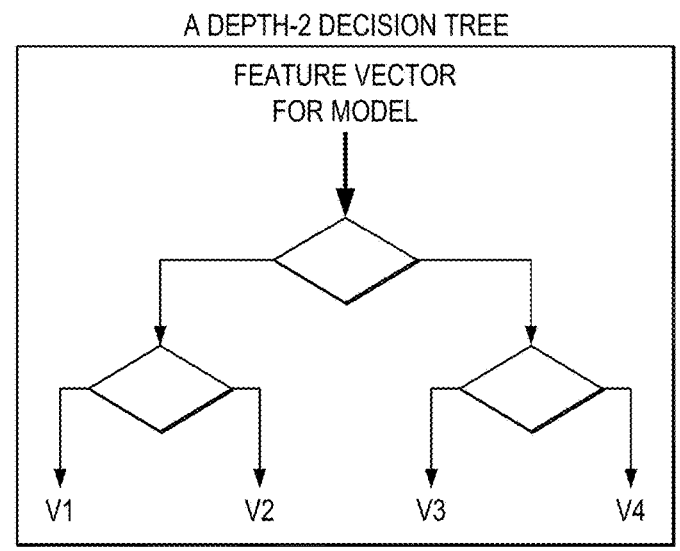
FIG. 6 illustrates a depth=2 decision tree.

(2) 1024 number of decision trees of depth 2 act as weak classifiers for ADA boost. A single weak classifier is depicted in FIG. 6.

Figure 5:
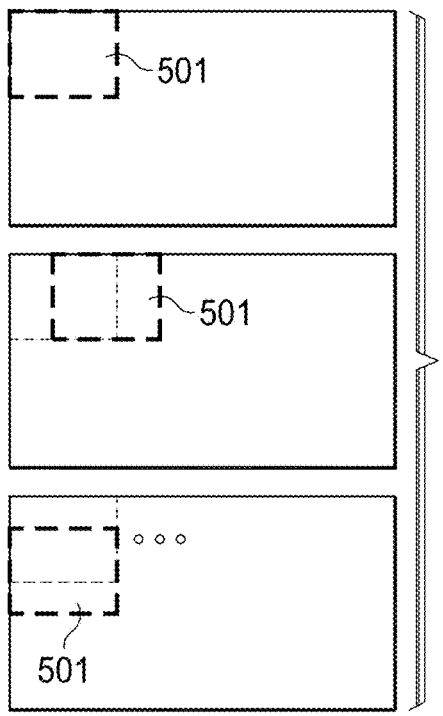
FIG. 5 shows various positions of the models inside the image.

Features computed from 32×32 pixel blocks of images (known as a model) are used as inputs to the classifier (block 104). The model is made to step by 4 pixels (both horizontal and vertical) on each image and each scale, as shown in FIG. 5. At each position of the model 501 a feature vector of size 640 pixels is computed using the feature planes.

Feature vectors obtained in this manner from training images are used for training the ADA boost classifier (block 104). Training is done in four stages with 32, 128, 256, 1024 weak classifiers used in each stage. Boot strapping is used in each stage to strengthen the hypothesis.

The feature vector of size 640 pixels is fed to the ADA boost classifier. The ADA boost returns a real number which is binary thresholded to decide if a traffic sign is present or not. Note that the localization procedure is only a binary decision procedure where it is decided if a traffic sign is present or not. Actual classification (categorization to specific class) is done in the next stage.

Traffic sign classification Stage 3 (block 105) is done by:

The windows that are marked as containing traffic signs in Stage 2b are passed to the traffic sign classification stage (block 105) for categorization. Stage 2b is designed with maximum sensitivity in mind, i.e. no valid traffic sign should be missed but few false positives are acceptable. These false positives are filtered out by Stage 3.

The feature vector used in Stage 3 is of size 2992 pixels in one example and is used as an input to a Linear Discriminant Analysis (LDA) classifier.

LDA relies on minimization of a Mahalanobis distance between a feature vector and the mean vector of various classes. The Mahalanobis distance of an observation $$x=(x_1,x_2,x_3,\ldots,x_N)^T$$

from a group of observations with mean $$\mu=(\mu_1,\mu_2,\mu_3,\ldots,\mu_N)^T$$

and covariance matrix S is defined as:

$$D_M(x)=\sqrt{(x-\mu)^T S^{-1}(x-\mu)}.$$

The minimization of the Mahalanobis distance is mathematically equivalent to minimization of the below function:

$$g_i(x)=w_i^T x+w_{i0}$$

where $g_i(x)$ is a cost function for class 'i', $w_i$ is a weight vector for class 'i', $w_{i0}$ is bias for class 'i', and x is a vector of size 2992 pixels.

$w_i$ and $w_{i0}$ are pre-computed (during training) and are different for different classes. For a given feature vector x, $g_i(x)$ is computed for each class and the feature vector is associated with the class that gives the minimum value of the function g(x).

Temporal smoothening Stage 4 (block 106) is performed by:

Removing the noisy detections and noisy classification that have been obtained from the earlier stages. This stage is present only when the input is a sequence of images that form a part of a video.

Figure 7:
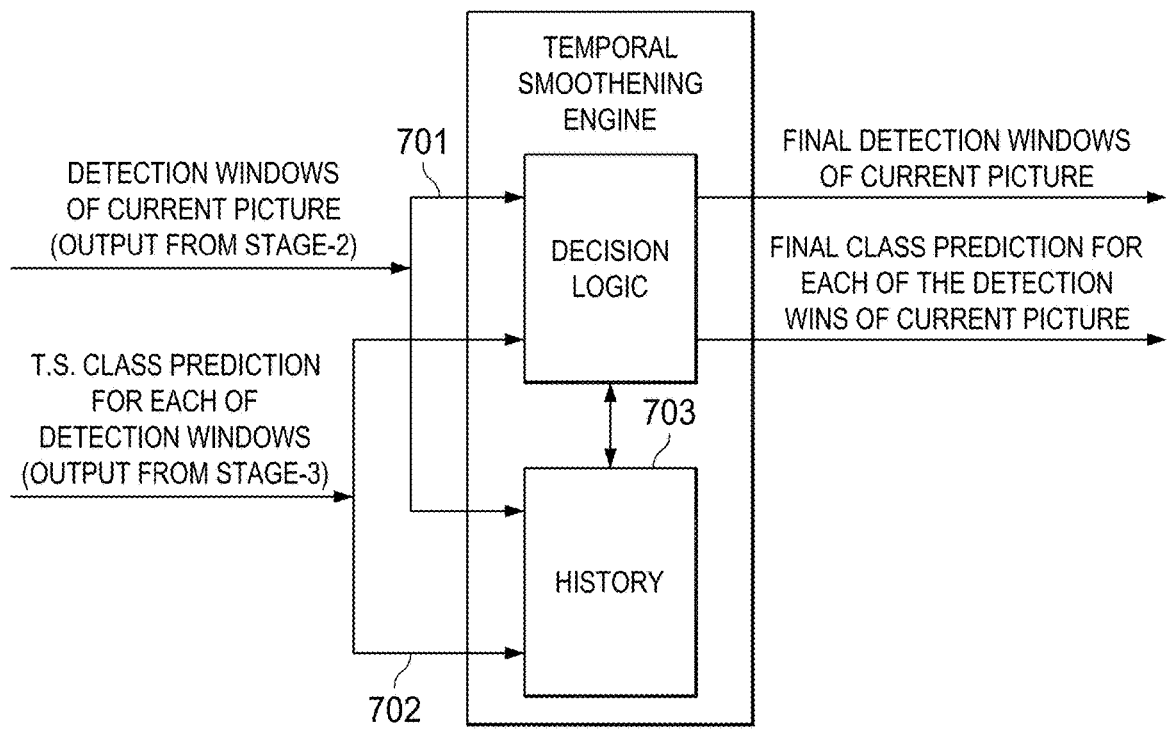
FIG. 7 illustrates a block diagram of the temporal smoothening engine.

An example of a temporal smoothening engine is conceptually depicted in FIG. 7. The inputs to the temporal smoothening engine are:

(1) The descriptors of detection windows 701 (position and dimensions) obtained from stage 2, and (2) Class id's 702 that are associated with each of these detection windows obtained from stage 3.

The temporal smoothening engine internally maintains a history of the detection windows. This history is empty at the start of the sequence of pictures and is updated after every picture. A decision logic block inside the temporal smoothening engine looks at the inputs and the history before finalizing the windows and its associated class.

The temporal smoothing engine may use the Jaccard coefficient to measure degree of similarity between windows detected in the current picture and the windows stored in the history. The Jaccard coefficient J(A,B) between two windows A and B is defined as follows, $$J(A, B) = \frac{|A \cap B|}{|A \cup B|}.$$

The numerator term denotes the area under intersection and the denominator term denotes the area in the union of the two windows.

Figure 8:
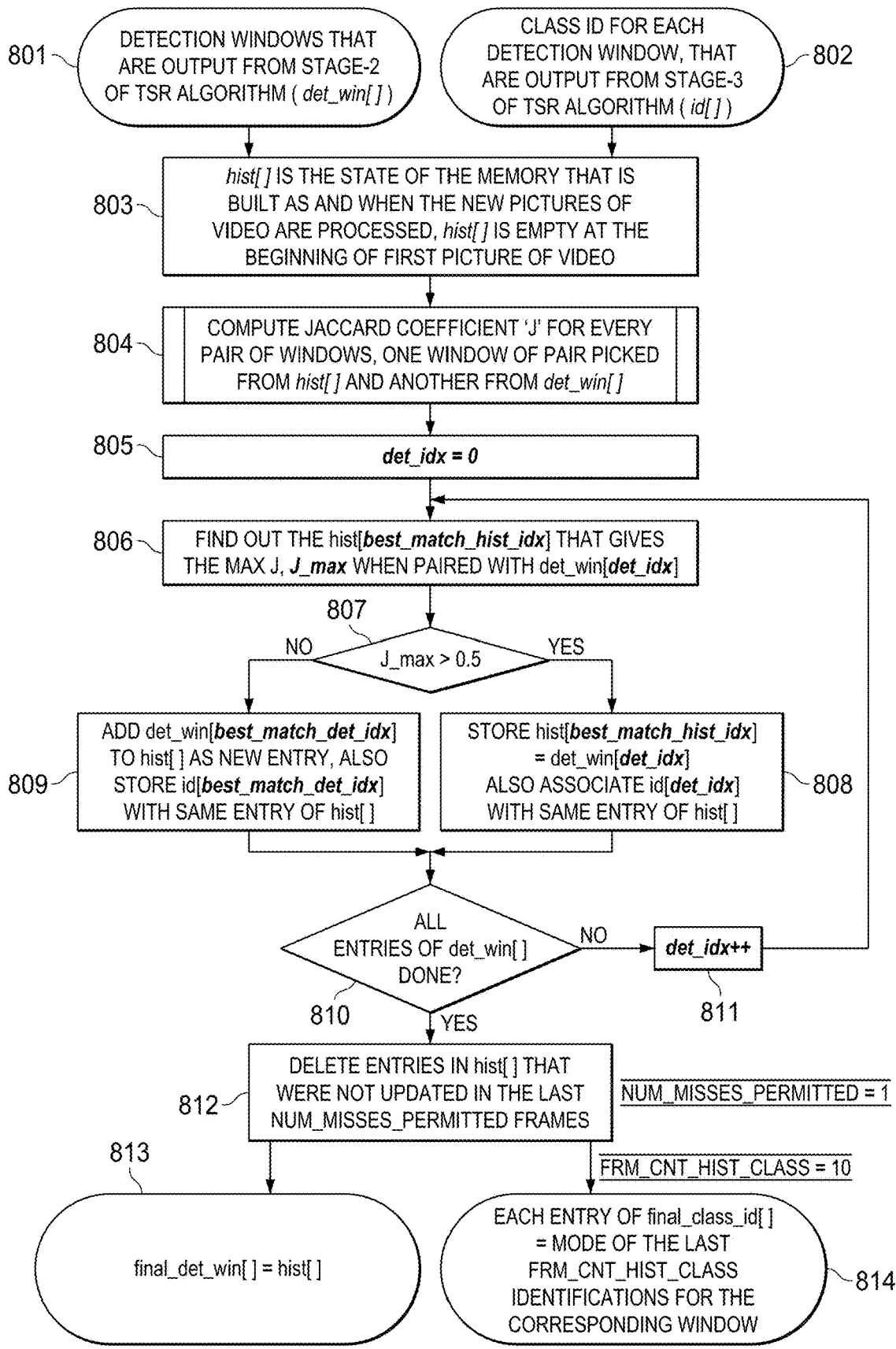
FIG. 8 shows a flow chart of the temporal smoothening engine.

The details of the temporal smoothening engine are shown in FIG. 8. Inputs to the temporal smoothing engine are the detection windows (det_win[ ]) 801 output from stage 2 (block 102) of the TSR algorithm, and the class id (id[ ]) 802 for each detection window. In step 803, hist[ ] is the state memory that is built when a new picture is processed. The Jaccard coefficient is computed in step 804 for every pair of windows, where each pair includes one window selected from hist[ ] and one window selected from det_win[ ]. In step 805 det_idx is set to zero.

Then, in step 806, the window within hist[ ] that gives the maximum Jaccard coefficient value (J_max) when paired with the selected window from det_win[ ] (referred to as det_win[det_idx]) is determined. This window is referred to as hist[best_match_det_idx].

If J_max is equal to or greater than 0.5 in decision step 807, then hist[best_match_det_idx] is set as equal to det_win[det_idx], and id[det_idx] is associated with that same entry in hist[ ] at step 808. If J_max is less than 0.5 at decision step 807, then det_win[best_match_det_idx] is added to hist[ ] as a new entry, and id[best_match_det_idx] is stored with the same entry of hist[ ] in step 809.

At decision step 810, we determine if all entries of det_win[ ] have been processed. If not, det_idx is incremented in step 811, and the flow returns to step 806. If all entries of det_win[ ] have been processed, then all hist[ ] entries that have not been updated are deleted in step 812.

The outputs of temporal smoothening engine are a final set of detection windows 813 and final class identifications 814, which are used as the final outputs of the TSR system.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A method comprising:
   receiving an image;
   extracting binary masks from the image, wherein each of the binary masks is associated with a respective color;
   performing shape detection operations on the image using the binary masks such that each of the shape detection operations is performed on a respective subset of the binary masks, wherein the performing of the shape detection operations identifies a shape in the image;
   determining a location of interest based on the shape;
   determining a localized window within the image around the location of interest; and
   performing classification on the localized window within the image to determine whether an object is present within the localized window.

2. The method of claim 1 further comprising determining whether the object is a traffic sign.

3. The method of claim 1 further comprising performing morphological opening on the binary masks prior to the performing of the shape detection operations using the binary masks.

4. The method of claim 1, wherein the performing of the shape detection operations using the binary masks includes:
   performing edge detection on the image to determine a first set of edges; and
   for each of the shape detection operations:
      determining a second set of edges by applying the respective subset of the binary masks to the first set of edges to remove an edge that does not correspond to a color of the respective subset of the binary masks; and
      determining whether a respective shape is present based on the second set of edges.

5. The method of claim 4, wherein the performing of the shape detection operations includes, for a first operation of the shape detection operations, determining a center point and a radius of the respective shape.

6. The method of claim 5, wherein the location of interest is based on at least one of the center point and the radius of the respective shape.

7. The method of claim 1 further comprising performing histogram equalization on the image prior to the extracting of the binary masks from the image.

8. The method of claim 1 further comprising converting a color space of the image prior to the extracting of the binary masks from the image.

9. The method of claim 1 further comprising subsampling the image prior to the extracting of the binary masks from the image.

10. The method of claim 1, wherein the performing of the classification on the localized window includes applying a feature extraction operation to the image to determine a set of feature planes for the image.

11. The method of claim 10, wherein the feature extraction operation includes performing adaptive bosting classification.

12. An advanced driver assistance system comprising:
a processor;
a non-transitory memory configured to store instructions that, when executed by the processor, cause the processor to:
receive an image;
extract binary masks from the image;
perform shape detection operations on the image using the binary masks such that each of the shape detection operations is performed on a respective subset of the binary masks, wherein the performing of the shape detection operations identifies a shape in the image;
determine a location of interest based on the shape;
determine a localized window within the image and around the location of interest; and
perform classification on the localized window within the image to determine whether an object is present within the localized window.

13. The advanced driver assistance system of claim 12, wherein the instructions cause the processor to determine whether the object is a traffic sign.

14. The advanced driver assistance system of claim 12, wherein the instructions cause the processor to perform morphological opening on the binary masks prior to the performing of the shape detection operations using the binary masks.

15. The advanced driver assistance system of claim 12, wherein the instructions to perform the shape detection operations include instructions that cause the processor to:
perform edge detection on the image to determine a first set of edges; and
for each of the shape detection operations:
determine a second set of edges by applying the respective subset of the binary masks to the first set of edges to remove an edge that does not correspond to a color of the respective subset of the binary masks; and
determine whether a respective shape is present based on the second set of edges.

16. The advanced driver assistance system of claim 15, wherein the instructions to perform the shape detection operations cause the processor to, for a first operation of the shape detection operations, determine a center point and a radius of the respective shape.

17. The advanced driver assistance system of claim 16, wherein the location of interest is based on at least one of the center point and the radius of the respective shape.

18. The advanced driver assistance system of claim 12, wherein the instructions cause the processor to perform histogram equalization on the image prior to the extracting of the binary masks from the image.

19. The advanced driver assistance system of claim 12, wherein the instructions cause the processor to convert a color space of the image prior to the extracting of the binary masks from the image.

20. The advanced driver assistance system of claim 12, wherein the instructions cause the processor to subsample the image prior to the extracting of the binary masks from the image.

* * * * *